UNITED STATES PATENT OFFICE.

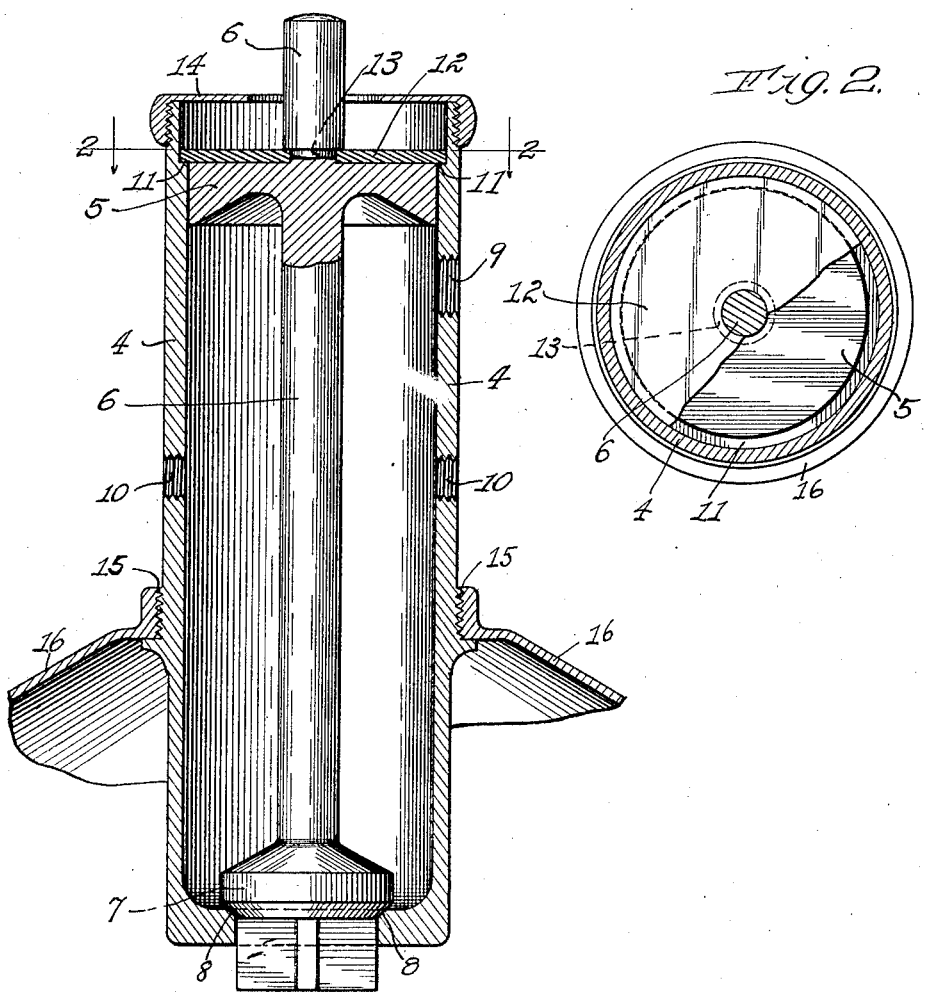

MARK LEACH, OF OWATONNA, MINNESOTA, ASSIGNOR TO LIBERTY MILKER COMPANY, OF OWATONNA, MINNESOTA, A CORPORATION OF MINNESOTA.

MILKER-CHAMBER.

1,332,346.  Specification of Letters Patent.   Patented Mar. 2, 1920.

Application filed February 26, 1919. Serial No. 279,366.

*To all whom it may concern:*

Be it known that I, MARK LEACH, a citizen of the United States, residing at Owatonna, in the county of Steele and State of Minnesota, have invented certain new and useful Improvements in Milker-Chambers, of which the following is a specification.

My invention relates to milker chambers, and has for its object the provision of a simple and efficient sealing means for the joint between a cylinder and piston of a milker chamber.

Other objects will appear hereinafter.

An embodiment of my invention is shown in the accompanying drawing, forming a part of this specification, and in which—

Figure 1 is a vertical section of a milker chamber embodying my invention; and

Fig. 2 is a view taken substantially on line 2—2 of Fig. 1.

In the drawing I have indicated a cylindrical member 4 which incloses a chamber which collects milk in a milker apparatus. This member 4 is preferably cylindrical, or at least has a cylindrical bore, and in the upper portion is mounted a piston 5. Axially of the member 4 and attached to the piston 5 is a stem 6 which extends substantially throughout the cylinder 4. At the lower end of the stem 6 is a valve 7 which coöperates with a seat 8 in the bottom of the member 4.

The member 4 is preferably provided with an opening 9 which is adapted to be connected with a pumping means, not shown, adapted for producing both suction and compression strokes. One or more openings 10 may be provided in the cylinder 4, and preferably lower than the opening 9. These openings 10 are adapted to be connected with the part of the milker apparatus which is attached to the cow's udder, not shown.

The parts of the apparatus heretofore described are already in use, and in such apparatus the joint between the piston 5 and the cylinder 4 must be formed so as to provide a fluid-seal. In order to do this the piston 5 must fit very snugly in the cylinder 4. In use the valve 7 often sticks in the cylinder due to milk getting in the joint between the piston and cylinder, and due to other foreign matter getting into this joint. Such foreign matter often causes the valve to stick, thereby hindering the operation of the device. This foreign accumulation is often due to not thoroughly cleaning the device after use.

In the present invention I form the piston 5 in a size so that it fits comparatively loose in the cylinder 4, or at least loose enough so that a sealing joint may not be effected. This permits of less expense in making the piston since the fit does not have to be so accurate as in the former devices of this kind. This extra space between the piston 5 and cylinder 4 also prevents the piston from sticking in the cylinder due to foreign accumulations above referred to.

In order to effect a seal in the joint between the piston 5 and cylinder 4, I form an enlargement in the bore in the upper end of the member 4, providing a shoulder 11 substantially at the top of the piston 5, and on the top of the piston 5 I provide a substantially thin flexible member 12, such as a disk of sheet rubber composition. The member or plate 12 may be held against the piston 5 in any suitable manner, but I find by making a groove 13 in the stem 6 at the top of the piston 5 and providing an opening fitting said groove, the flexible member 12 will be held properly.

In the use of the device when suction has been produced in the cylinder 4, this suction tends to draw the piston 5 downwardly, since the piston is of greater area than the valve 7. The suction also tends to draw the flexible member 12 downwardly and brings it into close engagement with the top portion of the piston 5 and the shoulder 11, thereby effectively sealing the joint between the piston 5 and cylinder 4. Upon compression being formed in the chamber of cylinder 4, the valve 7 is raised off its seat by the pressure of said compression on the under side of piston 5, permitting milk in the bottom of the cylinder to flow out through the valve seat 8, and upon another suction stroke the valve is again seated on its seat 8, and the joint between the piston 5 and cylinder 4 again sealed by the member 12 engaging the top of said piston and said shoulder 11.

I preferably provide a cap 14 to partially close the top of the cylinder 4. The cap may be secured to the cylinder in any suitable manner, such as the threads shown. The end of the stem 6 preferably extends through an opening in the cap so that it may be raised or lowered manually when desired. The device may be supported in any suitable manner, such as the threaded connection 15 shown in the drawing, the part 16 being a member suitable for resting on a milk can, or the like, not shown.

I claim:—

1. A milker chamber comprising a cylinder having a shoulder therein; a piston in the cylinder; and a plate engaging said shoulder and piston sealing the joint between said cylinder and piston.

2. A milker chamber comprising a cylinder having a valve seat in its lower portion and a shoulder in its upper portion; a valve engaging said valve seat; a piston in said cylinder; a stem connecting the valve and piston; and a flexible member engaging said shoulder and adapted to seal the joint between said piston and cylinder when said valve is seated.

3. A milker chamber comprising a cylinder having a valve seat in its lower portion and a shoulder in its upper portion; a valve engaging said valve seat; a piston in said cylinder; a stem connecting the valve and piston; and a flexible member on the upper side of the piston engaging said shoulder and adapted to seal the joint between the piston and cylinder when said valve is in engagement with said valve seat.

4. A milk chamber comprising a cylinder having a valve seat in its lower portion and a shoulder in a plane substantially perpendicular to the axis of the cylinder in its upper portion; a valve seated in said valve seat; a piston in the cylinder; a piston rod connecting the valve and piston and adapted to position the upper side of the piston in substantially the plane of said shoulder when the valve is seated in said seat; and a flexible member disposed on said shoulder and piston sealing the joint between the latter and said cylinder.

5. A milker chamber comprising a cylinder having a valve seat in its lower portion; a valve engaging said valve seat; a stem on the valve; a piston on the stem, there being a shoulder in the cylinder at the upper side of the piston and a groove in the stem at said upper side of the piston; and a flexible member engaging said groove and said shoulder.

6. A milker chamber comprising a valve; a stem attached to said valve; a piston attached to said stem, there being a groove in the stem at the upper side of said piston; a flexible member having an opening in its central portion engaging said groove; a cylinder inclosing said valve, stem, piston and flexible member, there being an enlargement in the upper portion of said cylinder providing a shoulder engaging the under side of said flexible member; and a cap removably secured to the top of said cylinder.

7. A milk chamber comprising a cylinder having a shoulder therein; a piston in said cylinder; a stem attached to said piston; and a flexible plate on the piston engaging said shoulder and adapted to seal the joint between said cylinder and said piston, said flexible member having its central portion held against the piston and its edge portions resting loosely against said shoulder.

In testimony whereof I have signed my name to this specification on this 21st day of February, A. D. 1919.

MARK LEACH.